United States Patent [19]

Kocher

[11] Patent Number: 4,945,941

[45] Date of Patent: Aug. 7, 1990

[54] MEANS TO REDUCE VIBRATION IN CHECK VALVES AND STOP/CHECK VALVES CAUSED BY PULSATING LOW FLUID FLOW

[75] Inventor: Erich J. Kocher, Milwaukee, Wis.

[73] Assignee: Vilter Manufacturing Corporation, Milwaukee, Wis.

[21] Appl. No.: 489,252

[22] Filed: Mar. 5, 1990

[51] Int. Cl.⁵ .................. F16K 43/00; F16K 15/18; F16K 1/02

[52] U.S. Cl. .................................. 137/315; 137/469; 251/82; 251/214; 251/273; 251/364

[58] Field of Search .............. 137/315, 377, 381, 469; 251/77, 82, 88, 118, 214, 264, 273, 330, 364

[56] References Cited

U.S. PATENT DOCUMENTS

| | | | |
|---|---|---|---|
| 217,745 | 7/1879 | Pringle et al. | 137/469 |
| 2,622,613 | 12/1952 | McNeal | 137/469 |
| 2,695,032 | 11/1954 | Kmiecik | 137/469 |
| 3,123,092 | 3/1964 | Kmiecik et al. | 137/469 |
| 3,422,840 | 1/1969 | Bryant et al. | 137/469 |
| 3,605,793 | 9/1971 | Kinsel | 137/469 |
| 4,484,596 | 11/1984 | Hikade et al. | 251/214 |
| 4,634,093 | 1/1987 | Schintgen | 251/82 |
| 4,799,506 | 1/1989 | Taylor | 137/469 |

Primary Examiner—George L. Walton
Attorney, Agent, or Firm—Nilles & Nilles

[57] ABSTRACT

In a check valve or stop/check valve comprising a housing having an inlet port, an outlet port and a valve seat between the two ports, a valve disc moves axially within a valve housing between open and closed positions, so that fluid flow applies pressure against the valve disc to automatically open the valve, but when the fluid stops or reverses, the valve automatically closes to prevent backwash. Under conditions of pulsating, low-volume fluid flow, a ridge on the valve seat and a deflector ring on the valve disc deflects the flow of fluid, thereby using the velocity of fluid to increase pressure against the valve disc so as to smoothly and gently move the valve disc, reduce vibration of the valve disc and prevent it from striking the valve seat.

13 Claims, 2 Drawing Sheets

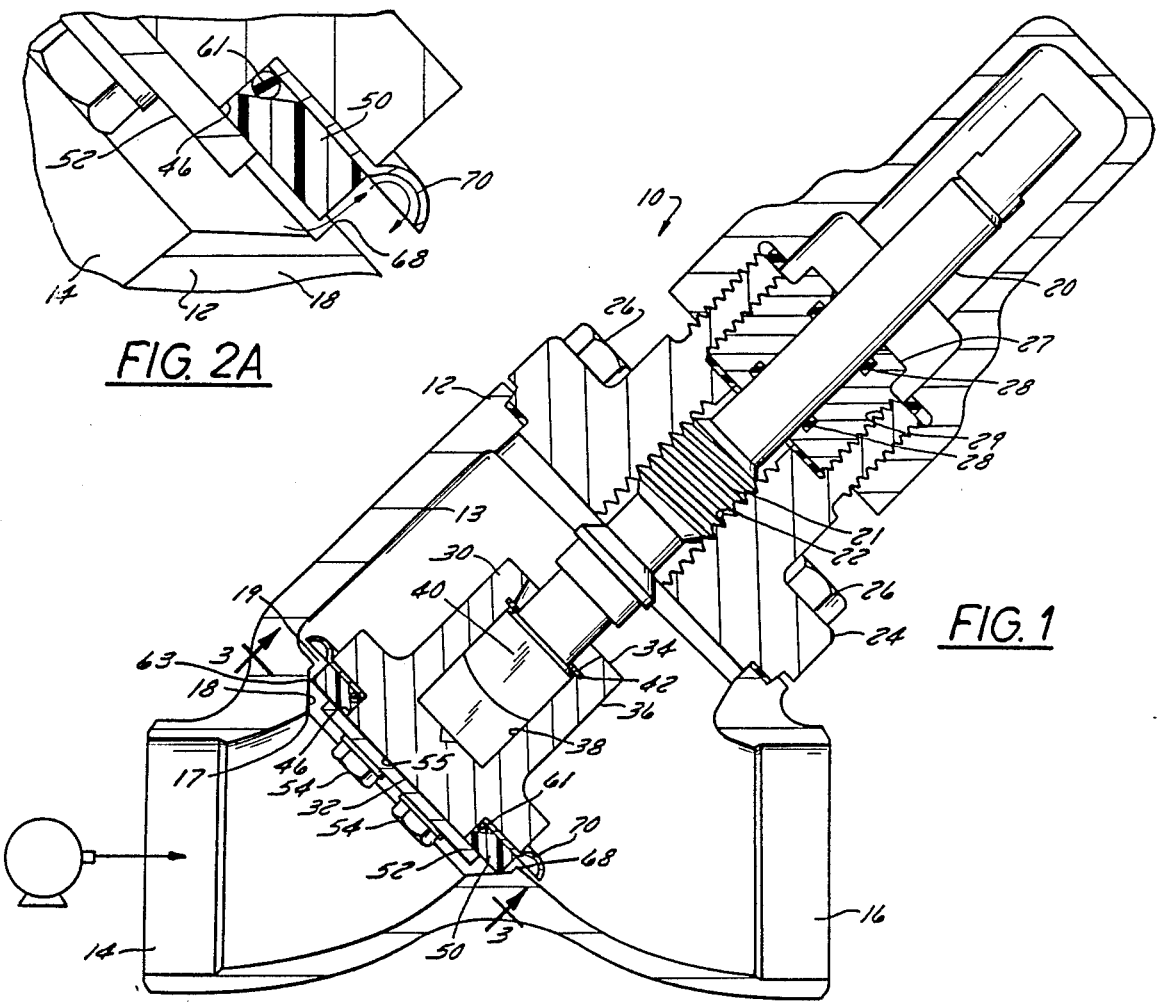
FIG. 2A
FIG. 1
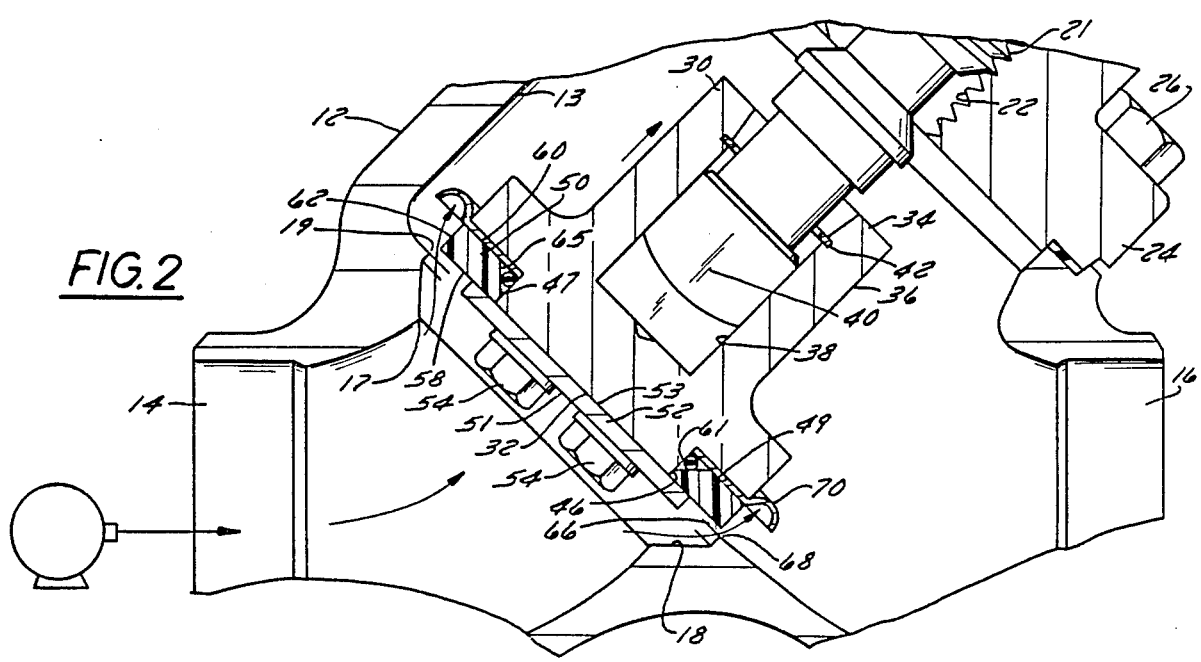
FIG. 2

MEANS TO REDUCE VIBRATION IN CHECK VALVES AND STOP/CHECK VALVES CAUSED BY PULSATING LOW FLUID FLOW

BACKGROUND OF THE INVENTION

1. Field of the Invention

The invention disclosed in this patent pertains to check valves and stop/check valves for controlling the flow of fluid. Under conditions where the fluid is pulsating and flowing at a relatively low volume, a disc inside the valve tends to vibrate and strike against the valve seat. The invention incorporates into such valves a means for changing the path of flow of fluid which is pulsating and flowing at a relatively low volume so as to reduce vibration of the disc, and to prevent the disc from striking the valve seat.

2. Description of the Related Art

Valves are used to control the flow of fluids in various systems. For instance, stop valves, check valves and stop/check valves are often used to control refrigerants circulated under high pressure in refrigeration systems. A typical stop valve controls flow by being manually turned to the fully closed position which stops the flow of fluid, or fully opened position to permit maximum flow through the valve, or an intermediate position to regulate the flow. Check valves permit flow in only one direction and are used in lines where reverse flow is undesireable. When the fluid flows in the desired direction, a check valve utilizes the pressure drop across the valve to automatically open to permit the flow of fluid, but if the fluid stops or reverses direction the valve closes to prevent backwash. A stop/check valve combines the function of both a stop valve and check valve. A typical stop/check valve can be manually turned to a closed position to stop all flow of fluid, or turned to an open position whereby it automatically opens when the fluid flows in the desired direction and closes when the fluid stops or reverses to prevent backwash.

Check valves and stop/check valves rely on a sufficient fluid flow to open the valve. A pulsating, low-volume flow of fluid through a check valve or stop/check valve, however, will cause a disc within the valve to vibrate and strike the valve seat in response to the pulsation, causing unusually loud noise and, more seriously, damage to the valve.

A conventional stop/check valve typically comprises a valve housing having a fluid inlet port, fluid outlet port, valve seat between the two ports, and an inner wall between the valve seat and outlet port. Within the valve housing is a cylindrical metal valve disc which moves axially toward and away from the valve seat between closed and open positions, respectively. The means for moving the valve disc between open and closed positions typically comprises a rotatable valve stem which extends through an opening in the valve housing down to the valve disc. The lower end of the valve stem is connected to the valve disc in a manner which permits the valve disc to rotate and slide with respect to the valve stem. This type of rotatable, slidable connection can be made by a protuberance on the lower end of the valve stem which is inserted into a recess in the upper side of the valve disc and secured by a retaining ring fastened to the valve disc.

In one type of stop/check valve, the valve disc has an annular groove formed around the outer periphery of its lower side and a seal ring is disposed in the groove. The seal ring is held in the groove by a smaller-diameter circular metal retainer plate which is fastened to the lower side of the valve disc and presses against the front side of the seal ring.

To close the stop/check valve, the valve stem is rotated to move the valve disc toward the valve seat until the seal ring bears against the surface of the valve seat. The ability of the valve disc to rotate with respect to the valve stem allows the seal ring to engage and disengage the valve seat without scraping along the surface of the valve seat, which could damage the seal ring. To open a stop/check valve, the valve stem is rotated so that it moves in a direction away from the valve seat. With the valve stem having been turned to the open status, a sufficient amount of fluid flowing in a direction from the inlet port to the outlet port will cause the valve disc to slide axially up the valve stem, disengaging the seal ring from the valve seat and creating an opening or passage for fluid to flow past the outer edge of the seal ring and between the valve seat and the valve disc. If the flow stops, reverse flow and gravity will slide the valve disc down the valve stem thus closing the passage and checking the flow of fluid.

A stop/check valve of this type is used, for example, in large refrigeration systems with multi-cylinder compressors, which are often provided with a capacity reduction mode. When starting or shutting down a multi-cylinder compressor, it is typically necessary to reduce capacity down from, for example, eight cylinders to two cylinders. Some operating conditions require continuous operations at reduced capacity. When the compressor is running on all eight cylinders the fluid flows at a relatively high velocity and pressure and the pulsating effect of the flow is negligible. Reducing capacity down to two cylinders means the fluid is now circulated by the alternating discharge of just those two cylinders. The discharge of the two cylinders causes the fluid to pulsate in rhythm with the discharge of each cylinder, which in turn causes the slidable valve disc to pulsate or vibrate with the flow. In other words, the pulsating low volume flow of fluid causes the valve disc to slide up and down the valve stem and bang against the valve seat. Such a pulsation of flow and resulting vibration of the valve disc is often the cause of a ringing or chatter noise in a refrigeration system, and on occasion can be quite loud. The vibrating valve disc can cause undue wear and damage to the seal ring, valve seat, valve disc or possibly other parts of the valve. Vibration of the valve disc may even contribute to the problem of fluid leakage between the seal ring and valve disc, even when the valve is closed. Pulsation of the fluid causes the same type of vibration, noise and damage in a check valve.

SUMMARY OF THE INVENTION

The object of the invention is to provide a means to reduce vibration of the valve disc caused by pulsating flow and prevent the valve disc from striking the seat during such flow conditions, and thus eliminate the problems of noise and damage. This can be accomplished by changing the path of flow of fluid between the valve seat and valve disc so that the pulsating fluid is directed against a deflector ring attached to the valve disc, which increases the pressure acting against the valve disc.

A stop/check valve of the type described above can be modified so that the valve disc has a deflector ring which extends outwardly around the periphery of the valve disc. The deflector ring has an outer concave surface when viewed from the inlet port. A notch, or ridge is provided on the valve seat.

When the valve stem is turned to the closed position, the valve disc bears the seal ring against the surface of the valve seat, and the deflector ring is in close proximity to, but does not touch, the valve seat and the inner wall of the valve housing.

When the valve stem is turned to the open position, sufficient fluid flow will slide the valve disc up the valve stem and away from the valve seat thereby opening the valve. Gravity slides the valve disc back down the stem when the flow stops or reverses.

When a pulsating low-volume flow exists, in which case the valve disc has a tendancy to pulsate with the flow, the ridge on the valve seat directs the flow of fluid into the concave surface of the deflector ring, which entraps and reverses the flow and provides an increase in pressure against the valve disc and counters the gravity pulling the disc down. The increase in pressure will act to reduce the vibration of the valve disc and to prevent the valve disc from striking the valve seat.

The ridge and deflector ring work to deflect the flow in this manner only under conditions of low fluid flow, where the valve disc is only slightly open. Under normal operating conditions of relatively high fluid velocity and pressure, the valve disc slides to the fully open position so that the ridge and deflector ring are spaced apart wide enough so as to have little, if any, effect on the flow.

The deflector ring may be a simple metal stamped ring which fits into the same annular groove in the valve disc as does the seal ring. The annular groove can be formed by the same process as it was for just the seal ring, only the depth of the groove accommodates both the deflector ring and seal ring. The ridge provided on the valve seat can be easily machined as part of the housing. The important feature here is that the valve has a means for deflecting the flow in the narrow passage between the valve seat and valve disc through which a fluid flows when the valve is partially opened so as to use the velocity to increase pressure against the valve disc. The same means for deflecting a pulsating flow in a stop/check valve may be used in a check valve.

BRIEF DESCRIPTION OF THE DRAWINGS

FIG. 1 is a vertical cross-section view of a stop/check valve incorporating a means to reduce vibration caused by a pulsating low volume flow of fluid in accordance with the invention;

FIG. 2 is an enlarged vertical cross-section view of a portion of the valve when the valve disc is separated by a space from the valve seat;

FIG. 2A is a further enlarged view showing the orientation of the valve seat, valve disc, seal ring, ridge and deflector ring so that a pulsating low volume flow of fluid will be deflected in accordance with the principles of the invention;

FIG. 5A is a side elevation view of the deflector ring of FIG. 4a;

DESCRIPTION OF THE PREFERRED EMBODIMENT

Figure 3:
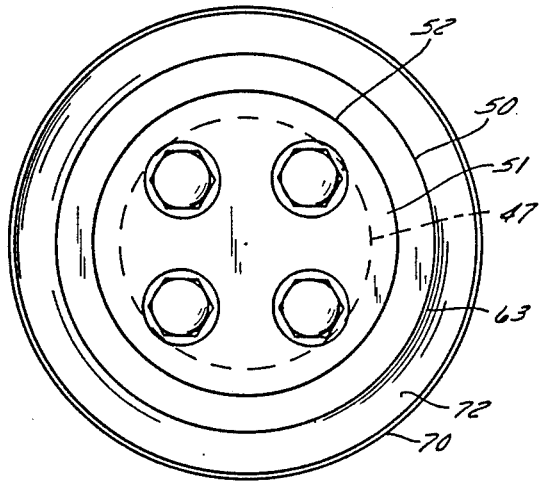
FIG. 3 is a bottom plan view of a portion of the valve taken on line 3—3 of FIG. 1.

FIG. 1 shows a stop/check valve 10 having a ridge 68 and deflector ring 70 for deflecting a pulsating low-volume fluid flow.

The stop/check valve 10 comprises a metal housing 12 having a fluid inlet port 14, fluid outlet port 16, an annular conically-shaped valve seat 18 between the two ports, and an inner wall 13 between the valve seat 18 and outlet port 16. The ridge 68 is provided on the outlet side of the valve seat 18. A rotatable valve stem 20 having a threaded portion 21 extends through a threaded opening 22 in a cover plate 24 which is secured to the valve housing 12 by housing bolts 26. O-ring seals 28 are provided in a bushing 27 in a threaded hole 29 in the cover plate 24 at the upper end of the valve stem 20 to make a fluid tight seal for the valve stem 20. The lower end of the valve stem 20 is connected to a circular valve disc 30 which moves axially toward and away from the valve seat 18 between closed and open position, respectively.

Referring to FIGS. 1 and 2, the valve disc 30 takes the form of a solid cylindrical metal member having a lower side 32, an upper side 34 and a cylindrical outer side 36. A protuberence 40 at the lower end of the valve stem 20 is inserted in a recess 38 in the upper side 34 of the valve disc 30. A mounting ring 42 secures the protuberance 40 to the upper side 34 of the valve disc 30 so as to movably connect the valve disc 30 to the valve stem 20. The movable connection allows the valve disc 30 to rotate and slide relative to the valve stem 20.

Figure 4A:
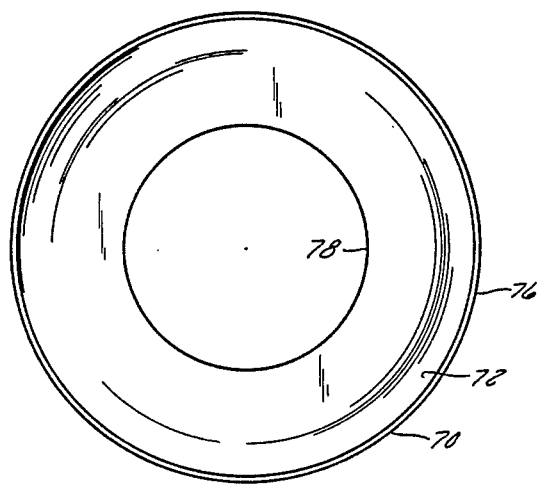
FIG. 4A is a bottom view of the deflector ring shown in FIGS. 1, 2 and 3 and shown removed from the valve.
Figure 4B:
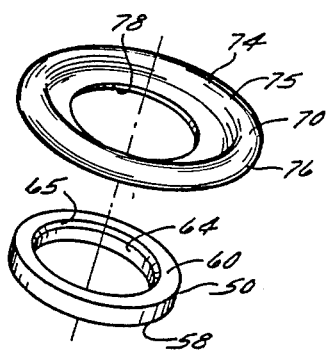
FIG. 4b is a bottom view of a seal ring shown in FIGS. 1, 2 and 3 and shown removed from the valve.
Figure 6:
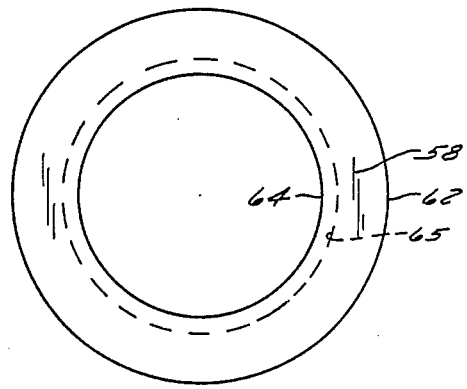
FIG. 6 is a perspective view of the deflector ring and seal ring, shown removed from the valve.
Figure 5A:
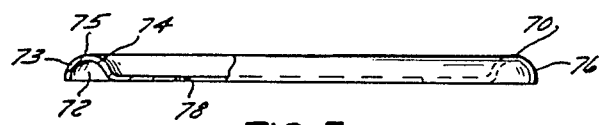
Figure 5B:
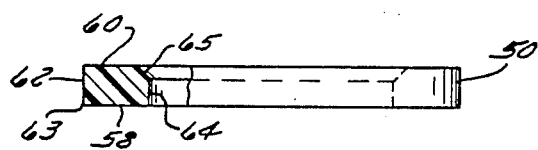
FIG. 5B is a side elevation view of the seal ring of FIG. 4b.

The deflector ring 70, seal ring 50, and an O-ring 61 are placed in an annular groove 46 formed around the periphery of the lower side 32 of the valve disc 30. The groove 46 is defined by a side wall 47 and a bottom wall 49 in the valve disc 30. FIGS. 2, 4b and 5b, show a seal ring 50 having a front side 58, a rear side 60, an outer edge 62, an inner edge 64 and an angled edge 65. FIGS. 2, 4a and 5a, show a deflector ring 70 having a front side 72 having an outer concave surface 73, a rear side 74 having an outer convex surface 75, an outer edge 76 and an inner edge 78.

FIGS. 1, 2 and 3 show the deflector ring 70 and seal ring 50 held in the groove 46 by a circular metal retainer plate 52, which has a front surface 51 and a rear surface 53 and bolt holes 55 through the retainer plate 52. A plurality of (four) retainer bolts 54 secure the retainer plate 52 against the lower side 32 of the valve disc 30 and against a portion of the front side 58 of the seal ring 50. The seal ring 50 is held in the groove 46 of the valve disc 30 by the rear surface 53 of the retainer plate 52, the side wall 47 of the groove 46 and the front side 72 of the deflector ring 70. The deflector ring 70 is held in the groove 46 by the rear side 60 of the seal ring 50, and the side wall 47 and bottom wall 49 of the groove 46 in the valve disc 30. The O-ring 61 is held in place by the side wall 47 of the valve disc 30, the front side 72 of the deflector ring 70, and the angled edge 65 of the seal ring 50. The O-ring 61 prevents leakage between the seal ring 50 and valve disc 30. The combined thickness of the deflector ring 70 and seal ring 50 is slightly greater initially than the depth of the groove 46 in valve disc 30, which allows for compression of the seal ring 50 as the retainer bolts 54 are tightened.

When the valve 10 is closed, a corner edge 63 of the seal ring 50 bears evenly against the conically-shaped annular valve seat 18. The seal ring 50 is fabricated from a slightly resilient, compressible, highly wear-resistant plastic, such as "TEFLON", a registered trademark of the E. I. du Pont de Nemours Company, so that it is able to deform slightly so as to evenly and tightly engage the valve seat 18 to provide an even and tight seal when valve 10 is tightly closed. Upon opening the valve 10, the seal ring 50 is able to resume its normal shape. The seal ring 50 also has a very low coefficient of friction and resists wear damage resulting from repeated valve 10 closures.

The conically-shaped annular valve seat 18 is oriented so that its narrowest diameter 17 is adjacent the fluid inlet port 14, and its widest diameter 19 is adjacent the inner wall 13 of the valve housing 12, except in the area of the outlet port 16, in which case it is adjacent with the wall of the outlet port 16. The ridge 68 is provided on the circumference of the widest diameter 19 of the valve seat 18.

The valve stem 20 may be selectively turned to a closed status or an open status, or even to points in between. The valve stem 20 is in the closed status when it has been rotated toward the valve seat 18 so that the valve disc 30 engages the valve seat 18, in which case the valve disc 30 is in a closed position. The valve stem 20 is in the open status when it has been rotated away from the valve seat 18, in which case the valve disc 30 is free to slide axially along the valve stem 20 between open and closed positions.

When the valve disc 30 is in the closed position, the corner edge 63 of the seal ring 50 bears against the valve seat 18 somewhat near the narrowest diameter 17 of the valve seat 18, and the outer edge 76 of the deflector ring 70 is in close proximity to, but does not touch, the ridge 68 and the inner wall 13 of the valve housing 12. When the valve stem 20 is rotated to the open status and the fluid flow is sufficient to push the valve disc 30 up to the open position, the seal ring 50 backs off of the valve seat 18 creating a passage 66 between the seal ring 50 and valve seat 18 and the fluid in the system is thus able to flow through the valve 10. When the fluid stops or reverses direction, gravity slides the valve disc 30 down the valve stem 20 back into the closed position thus stopping any backwash which might otherwise occur.

In circumstances when a pulsating, low-volume of fluid flow is present, caused for example by the reduced capacity of a compressor, the valve disc 30 slides to an intermediate position, creating only a very narrow passage 66 between the seal ring 50 and valve seat 18. In this intermediate position, the ridge 68 slightly turns the direction of flow into the outer concave surface 73 of the deflector ring 70 and the flow is deflected such that the velocity of the fluid provides additional pressure against the valve disc 30 so as to gently and smoothly move the valve disc 30, to reduce vibration of the valve disc and to prevent it from banging against the valve seat 18. When the flow is strong enough to slide the valve disc 30 to a fully open position, there is adequate space such that the ridge 68 and deflector ring 70 will not adversely affect the flow of fluid.

The above description is for a stop/check valve, but the same principle of deflecting a pulsating flow may be applied to a check valve.

I claim:

1. A check valve for controlling the flow of fluid therethrough comprising:
   a housing having an inlet port and an outlet port, a valve seat between the inlet port and outlet port, and an inner wall surface located between the valve seat and the outlet port;
   a valve disc movable relative to the valve seat into a closed position where it engages the valve seat, and a open position where it is separated by a space from the valve seat;
   said valve disc being movable toward the open position in response to pressure from a high rate of fluid flow from the fluid inlet port to the fluid outlet port,
   said valve disc being movable to the closed position in response to fluid backwash from the fluid outlet port to the fluid inlet port;
   said valve disc tending to exhibit vibrating movement toward and away from the valve seat in response to pulsations in the flow of fluid as the fluid passes from the fluid inlet port to the fluid outlet port and, when the rate of fluid flow is relatively low and the frequency of pulsations is relatively low, tending to vibrate into and out of engagement with the valve seat;
   said valve disc having an annular groove around the periphery thereof;
   a removable deflector ring disposed in said annular groove for deflecting the flow of fluid through said space to increase pressure acting to move the valve disc so as to reduce vibrating movement of the valve disc and to prevent the valve disc from vibrating into and out of engagement with the valve seat when the rate of fluid flow and the frequency of pulsation are relatively low;
   a removable seal ring disposed in said annular groove for engagement with said valve seat when said valve disc is in the closed position; and
   means being positioned below said annular groove and extending along at least a portion of said annular groove for holding said deflector ring and said seal ring in said annular groove.

2. A check valve according to claim 1, further comprising a ridge provided on the valve seat for controlling and directing the flow of fluid toward said deflector ring.

3. A check valve according to claim 1, wherein the deflector ring extends outwardly around the periphery of the valve disc.

4. A check valve according to claim 3, wherein the deflector ring has an outer concave surface for reversing the flow of fluid directed therein.

5. A check valve according to claim 1, further comprising:
   a valve stem having a threaded upper portion and a lower end;
   said valve housing having a threaded opening for receiving and rotatably engaging the threaded upper portion of the valve stem; and
   the lower end of the valve stem movably connected to the valve disc.

6. A check valve according to claim 5, wherein the movable connection of the valve stem to the valve disc comprises:
   a protuberance at the lower end of the valve stem;
   said valve disc having a recess for inserting the protuberance therein; and a retaining ring fastened to the valve disc for movably engaging the protuberance.

7. A stop/check valve for controlling the flow of fluid therethrough comprising:
- a housing having a fluid inlet port, fluid outlet port, a valve seat between the inlet port and outlet port, and an inner wall between the valve seat and the outlet port;
- a valve disc movable between a closed position where it engages the valve seat and an open position where it is separated by a space from the valve seat;
- a valve stem, having an upper portion connected to the valve housing and a lower end connected to the valve disc, for moving the valve disc;
- said valve stem being selectively movable between a closed status wherein the valve disc is in the closed position, and an open status wherein the valve disc is movable toward the open position in response to pressure from a high rate of fluid flow from the fluid inlet port to the fluid outlet port and movable toward the closed position in response to a backwash from the fluid outlet port to the fluid inlet port;
- said valve disc tending to exhibit vibrating movement toward and away from the valve seat in response to pulsations in the flow of fluid as the fluid passes from the fluid inlet port to the fluid outlet port and, when the rate of fluid flow is relatively low and the frequency of pulsations is relatively low, tending to vibrate into and out of engagement with the valve seat;
- said valve disc having an annular groove around the periphery thereof;
- a removable deflector ring disposed in said annular groove for deflecting the flow of fluid through said space to increase pressure acting to move the valve disc so as to reduce vibrating movement of the valve disc and to prevent the valve disc from vibrating into and out of engagement with the valve seat when the rate of fluid flow and the frequency of pulsation are relatively low;
- a removable seal ring disposed in said annular groove of said valve disc for engagement with said valve seat when said valve disc is in the closed position; and
- means positioned below said annular groove and extending along at least a portion of said annular groove for holding said deflector ring and said seal ring in said annular groove.

8. A stop/check valve according to claim 7, further comprising a ridge provided on the valve seat for controlling and directing the flow of fluid toward said deflector ring.

9. A stop/clock valve according to claim 7, wherein the deflector ring extends outwardly around the periphery of the valve disc.

10. A stop/check valve according to claim 9, wherein the deflector ring has an outer concave surface for reversing the flow of fluid directed therein.

11. A stop/check valve according to claim 7, wherein the connection of the valve stem to the valve housing is made by the valve housing having a threaded opening, and the valve stem having a threaded portion inserted in and engaged with the threaded opening of the valve housing so that the valve stem may rotate between the open status and closed status.

12. A stop/check valve according to claim 7, wherein the connection of the lower end of the valve stem to the valve disc permits the valve disc to rotate and slide with respect to the valve stem.

13. A stop/check valve according to claim 12, wherein the rotatable, slidable connection of the lower end of the valve stem to the valve disc is made by the valve disc having a recess;
- the lower end of the valve stem having a protuberance inserted into the recess of the valve disc; and
- a retaining ring fastened to the valve disc for engaging the protuberance.

* * * * *